United States Patent
Huynh (10) Patent No.: US 8,589,704 B2
(45) Date of Patent: Nov. 19, 2013

(54) SYSTEM FOR A SCALABLE AND PROGRAMMABLE POWER MANAGEMENT INTEGRATED CIRCUIT

(75) Inventor: Steven Huynh, Santa Clara, CA (US)

(73) Assignee: Active-Semi, Inc. (VG)

(*) Notice: Subject to any disclaimer, the term of this patent is extended or adjusted under 35 U.S.C. 154(b) by 2113 days.

(21) Appl. No.: 11/452,713

(22) Filed: Jun. 13, 2006

(65) Prior Publication Data

US 2006/0288246 A1 Dec. 21, 2006

Related U.S. Application Data

(60) Provisional application No. 60/691,721, filed on Jun. 16, 2005.

(51) Int. Cl.
- *G06F 1/26* (2006.01)
- *G06F 1/28* (2006.01)
- *G06F 1/32* (2006.01)

(52) U.S. Cl.
USPC ............ 713/300; 713/310; 713/323; 713/330

(58) Field of Classification Search
USPC ................. 713/300, 310, 320–324, 330, 340
See application file for complete search history.

(56) References Cited

U.S. PATENT DOCUMENTS

| | | | |
|---|---|---|---|
| 6,792,553 B2* | 9/2004 | Mar et al. | 713/330 |
| 7,249,267 B2* | 7/2007 | Chapuis | 713/300 |
| 7,373,527 B2* | 5/2008 | Chapuis | 713/300 |
| 7,456,617 B2* | 11/2008 | Chapuis et al. | 323/267 |
| 7,459,892 B2* | 12/2008 | Chapuis | 323/282 |
| 2006/0212138 A1* | 9/2006 | Zhang | 700/22 |

* cited by examiner

*Primary Examiner* — Fahmida Rahman
(74) *Attorney, Agent, or Firm* — Imperium Patent Works; Darien K. Wallace (57) ABSTRACT

A readily scalable modular progammable integrated circuit (IC) with improved power management is provided. An IC is described that contains one master controller module and a multiplicity of slave modules that include power-supplying functions, battery management functions, and analog and digital input-output functions. The master controller module configures the slave modules by writing data to the slave modules' configuration registers through the communication network. Each module contains a multiplicity of configuration registers that determine the module's operational and parametric characteristics. Programmability is achieved by configuring the modules to respond to appropriate signals on the configurable interconnection network.

20 Claims, 5 Drawing Sheets

| ICADDR | 0 | START | 0 | NEXT | 0 | NEXT | 0 | 0 |
|---|---|---|---|---|---|---|---|---|
| ICDATA | 0 | MODULE 1 DATA | 0 | MODULE 2 DATA | 0 | MODULE 3 DATA | 0 | |

SYSTEM FOR A SCALABLE AND PROGRAMMABLE POWER MANAGEMENT INTEGRATED CIRCUIT

CROSS-REFERENCE TO RELATED APPLICATIONS

The present Utility patent application claims priority benefit of the U.S. provisional application for patent No. 60/691,721 filed on Jun. 16, 2005 under 35 U.S.C. 119(e). The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the patent and Trademark Office, patent file or records, but otherwise reserves all copyright rights whatsoever.

FIELD OF THE INVENTION

The present invention relates to power integrated circuits. More specifically, the present invention relates to a scalable and programmable power management integrated circuit.

BACKGROUND OF THE INVENTION

Figure 1:
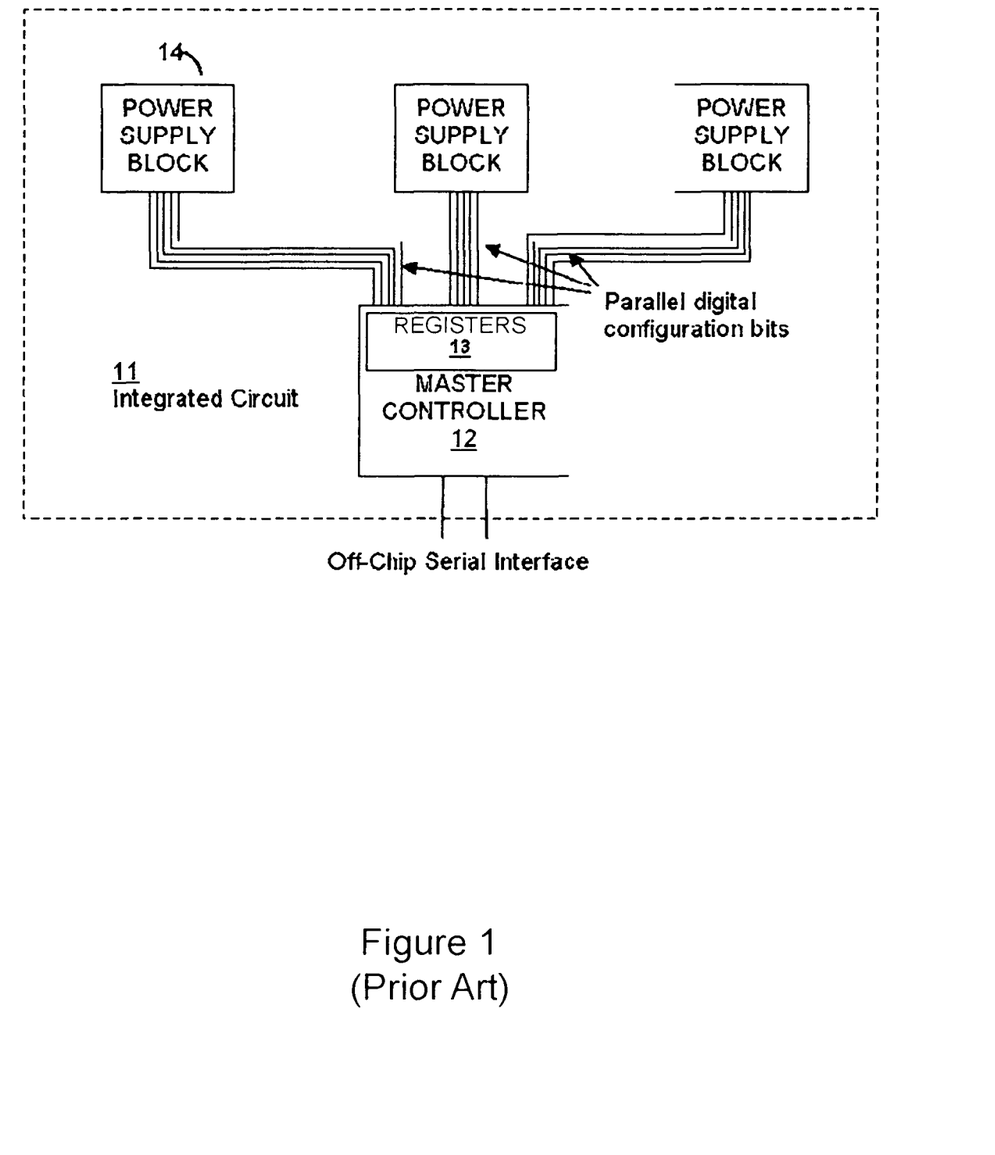
FIG. 1 is a block diagram of an exemplary prior art power management IC.

Power integrated circuits (ICs), especially for circuit systems that use a plurality of voltages, are becoming more and more complex with many different features and configurations. Prior art power management ICs such as, but not limited to, the DA9011/9030/9031 by Dialog Semiconductor Inc. (Irvine, Calif.) and the MAX1586A by Maxium Integrated Products, Inc. (Sunnyvale, Calif.) include several switching converters and linear regulators that have adjustable output voltages, but these power management ICs are essentially fixed in design and are developed for a specific and narrow range of power-using applications. For example, without limitation, FIG. 1 shows a prior art power management IC, in which a master controller controls power supply blocks via parallel configuration buses driven by configuration registers. Unfortunately, this parallel configuration bus architecture is not scalable, and thus disadvantageous. For instance, when there is a need for more configurable flexibility (hence more bits) and/or the number of power supply blocks in a chip increases, the result is a bus architecture with significantly more signal wires. Other prior art power management ICs use IC pins and passive components to configure the output voltage of a power supply block, which undesirably results in larger IC packages and more system components.

FIG. 1 shows a block diagram of an exemplary prior art power management IC 11. In power management IC 11 a master controller 12 controls power supply blocks 14 via parallel configuration buses driven by configuration registers 13. As previously described power management IC 11 is not scalable. Therefore, when there is a need for more configurable flexibility, or more bits, and/or the number of power supply blocks 14 in a chip increases, the result is a bus architecture with significantly more signal wires.

Beyond being inflexible, it is also very difficult and risky to scale up a given conventional power management IC design, especially as the number of required functions increase significantly. Scaling up or customizing known conventional ICs almost always involves significant resources and time to rework design, layout, and evaluation.

In view of the foregoing, there is a need for a more flexible power management IC that is highly programmable and scalable.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

SUMMARY OF THE INVENTION

To achieve the forgoing and other objects and in accordance with the purpose of the invention, a variety of techniques for a scalable and programmable power management integrated circuit are described.

In one embodiment of the present invention, an integrated circuit system is provided that includes a master controller module that controls at least one slave module (e.g., a power management or conversion device, or a voltage conversion device such as a charge-pump converter, a linear voltage regulator, a step-up voltage regulator, or a step-down voltage regulator that supplies power to on or off-chip loads, etc.) over a communication network (e.g., a serial or parallel communication network) that is at least in part controlled by at least one control command communicated from the master controller module to the at least one slave module, the at least one received control command being communicated and received through the communication network. In an embodiment, the commands are digitally encoded and at least one of the at least one slave modules comprises a digital configuration interface that receives the commands and is operable for decoding at least one of the commands and directly or indirectly controlling an aspect of the at least one slave module.

Some embodiments of the present invention are further configured with a program that when executed causes the master controller module to sequentially communicate certain control commands dictated by the program to at least one of the at least one slave modules, thereby making the slave module(s) functionally programmable.

Other embodiments of the present invention are further still configured to receive, from an external source, at least one programming instruction that when executed causes the master controller module to communicate certain control commands dictated by the program to at least one of the at least one slave modules, thereby making the slave module(s) functionally programmable.

In yet other embodiments of the present invention, two or more of the at least one slave modules are voltage conversion modules and the integrated circuit system further comprises a coupling device or connection that is configured to combine the power output of each voltage conversion module into one combined voltage conversion module, which is at least partially under the command control of the master control module.

Other embodiments of the present invention are provided that include means for carrying out the above functions.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive. Therefore, specific details disclosed herein are not to be interpreted as limiting, but rather as a basis for the claims and as a representative basis for teaching one skilled in the art to employ the present invention in virtually any appropriately detailed system, structure or manner.

The present invention will now be described in detail with reference to embodiments thereof as illustrated in the accompanying drawings.

Figure 2:
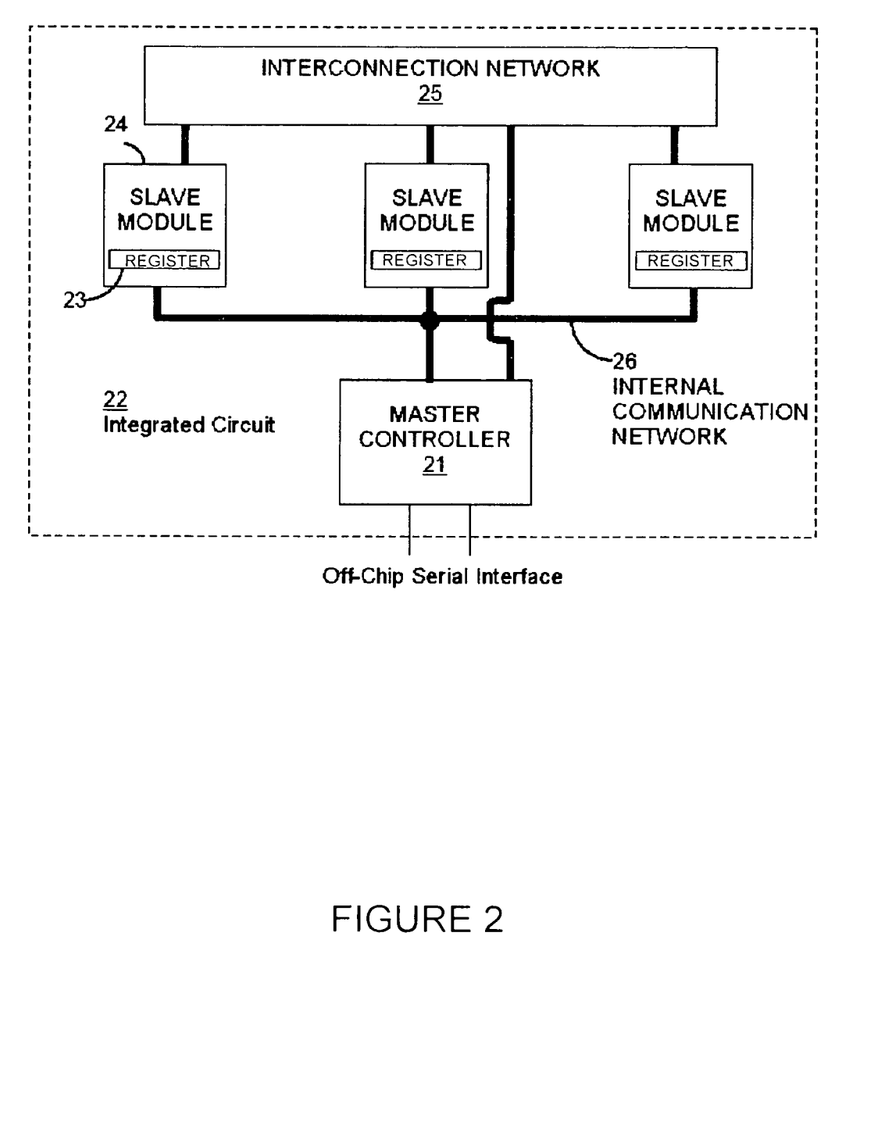
FIG. 2 is a block diagram of an exemplary power management IC that is scaleable and programmable, in accordance with an embodiment of the present invention.

FIG. 2 is a block diagram of an exemplary power management IC 22 that is scaleable and programmable, in accordance with an embodiment of the present invention. Power management IC 22 comprises multiple modules connected together by an internal communication network 26 and a configurable interconnection network 25. In the present embodiment, a master controller module 21 communicates with a multiplicity of slave modules 24 and off-chip devices. Examples of off-chip devices that master controller module 21 may communicate with include, without limitation, various microprocessors, micro-controllers, media-processors, CPUs, GPUs, DSPs, etc. Slave modules 24 may include, without limitation, linear regulator slave modules, switching converter slave modules, battery management modules, and analog and digital input-output slave modules and may perform functions such as, but not limited to, power-supplying functions, batter charging, protection, and management functions, analog-to-digital and digital-to-analog data converters, and general purpose analog and digital input-output functions. The present embodiment also includes without limitation at least one module supplying power to an off-chip load. The present embodiment also includes, without limitation, voltage conversion means such as, but not limited to, a linear regulator, a step-up converter, a step-down converter, or a charge pump converter.

On power-up, all of the modules and the interconnections are preferably set to default configurations that may be determined by various known methods such as, but not limited to, metal-mask programming, one-time programming, or EEPROM programming. Such programming methods are well known to those skilled in the art. In the preferred embodiment, commands are sent to master controller module 21 via an off-chip command interface (e.g., the serial communications interface shown) to configure and program power management IC 22. An exemplary off-chip serial interface is, without limitation, the I2C bus developed by Philips Semiconductor and known to those skilled in the art. The exact nature of the command interface is not important except that it is operable for communicating timely commands to master controller module 21. Although a wired serial interface is shown, those skilled in the art, in light of the teachings of the present invention, will readily recognize that a multiplicity of alternative and suitable command interfaces and protocols may be instead implemented. For example, without limitation, other suitable interfaces and protocols include SMBus, PMBus, SPI, micro-wire, one-wire bus, and various other multi-wire bus serial interfaces, as well as wired parallel data bus interfaces and optical and radio frequency interfaces.

In other embodiments (not shown), the command interface may instead be an internal module suitable for supplying commands to master controller module 21, such as an on-board programmable memory module from which the master controller module can read in stored command.

Figure 3:
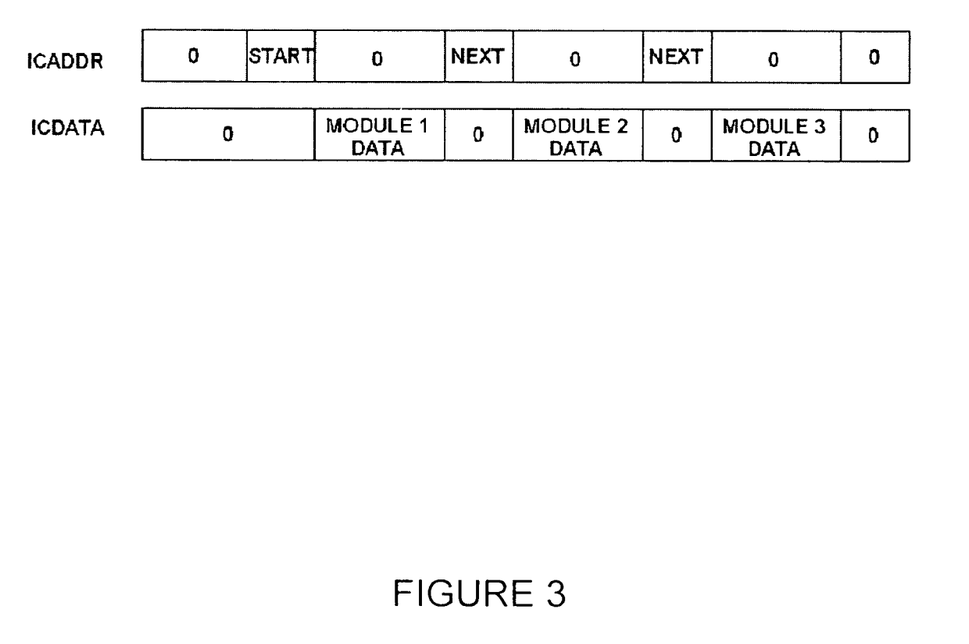
FIG. 3 shows an exemplary signal series of serial communication on the internal communication network, in accordance with an embodiment of the present invention.

FIG. 3 illustrates an exemplary signal series of serial communication on internal communication network 26, in accordance with an embodiment of the present invention. As shown by way of example in FIG. 2, master controller module 21 communicates with on-chip slave modules 24 via internal communication network 26. The present embodiment contains three signals for serial communication: an internal communication address signal (ICADDR), an internal communication data signal (ICDATA), and an internal communication synchronization clock (ICSYNC). Master controller 21 initiates the data transfer by sending a START command on an ICADDR wire. This command also begins the configuration of the registers in the first module, i.e. the module at address 1, along an ICDATA wire. Upon completion of wiring to the configuration bits in the module with address 1, the ICADDR signal sends out a NEXT command to increment the address to the next module on the ICDATA wire, i.e. the module at address 2, and so on. The exact architecture or protocol of the internal communication network is generally not important except that it be operable for communicating timely module data to the slave modules. Depending upon the needs of the particular application, those skilled in the art, in light of the present teaching, will recognize that a multiplicity of alternate and suitable internal communication protocols may be implemented. These variations may include, without limitation, fewer or more numbers of signals and other forms of addressing the modules, achieving the same function of serially transferring configuration data from the master controller to the power supply modules. Such alternative embodiments are contemplated as being within the spirit and scope of the present invention.

Figure 4:
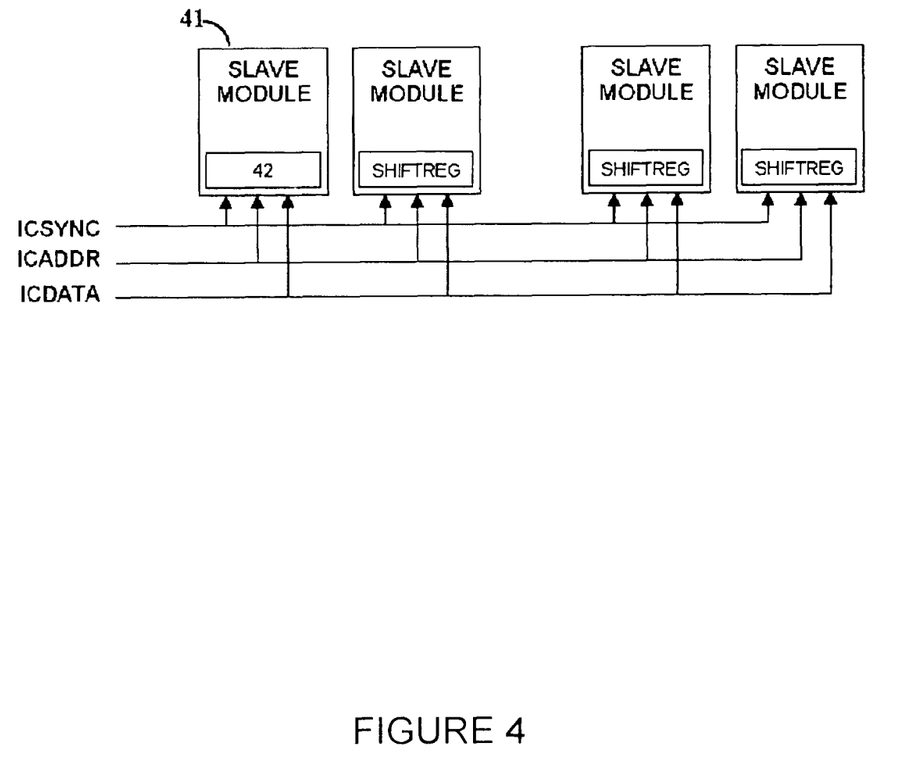
FIG. 4 shows a detailed view of exemplary internal communication network connections to slave modules, in accordance with an embodiment of the present invention.

FIG. 4 shows a detailed view of exemplary internal communication network connections to slave modules 41, in accordance with an embodiment of the present invention. As shown by way of example in the Figure an ICSYNC wire, the ICADDR wire and the ICDATA wire are connected to each slave module 41. The ICSYNC wire carries the ICSYNC signal. The ICADDR wire carries the ICADDR signal, and the ICDATA wire carries the ICDATA signal. In the present embodiment, the START command is a pulse that is two cycles wide, and the NEXT command is a pulse that is one cycle wide. Although a wired serial interface is shown, those skilled in the art, in light of the teachings of the present invention, will readily recognize that a multiplicity of alternative and suitable architectures or protocols of the internal communication network may be instead implemented depending upon the needs of the particular application. For example, without limitation, other suitable interfaces and protocols includes various other 1-wire and multi-wire serial bus interfaces, as well as various parallel data bus interfaces.

Figure 5:
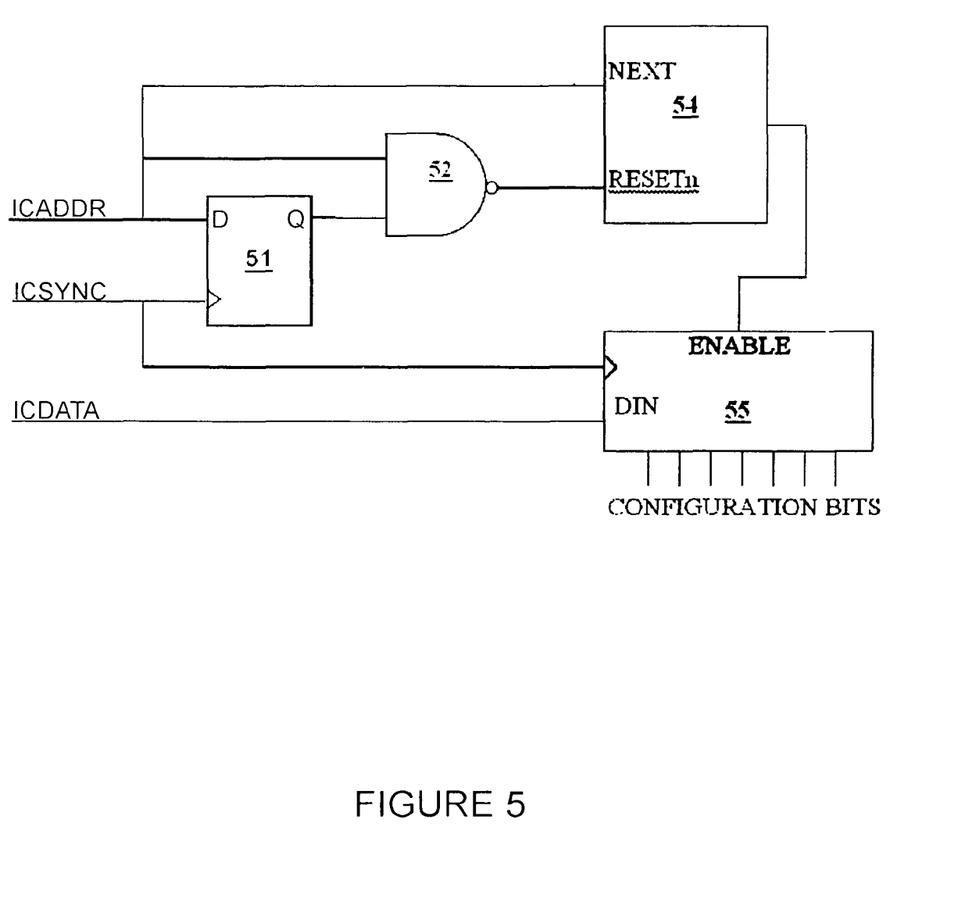
FIG. 5 shows exemplary receiver logic in each slave module of a scalable and programmable power management IC, in accordance with an embodiment of the present invention.

FIG. 5 shows exemplary receiver logic in each slave module of a scaleable and programmable power management IC, in accordance with an embodiment of the present invention. In the present embodiment, this logic comprises a flip-flop register 51, a NAND gate 52, a state-machine 54, and configuration registers 55. In the present embodiment, each module comprises a multiplicity of configuration registers 55 that determine the operational and parametric characteristics of the module. Programmability is achieved to respond to appropriate signals on the configurable interconnections network.

When the START command is detected, states in state-machine 54 reset. If the slave module has the first address, i.e. address 1, state-machine 54 resets to drive an ENABLE output high, enabling configuration registers 55 to shift in the data bits. If the slave module has the next address, i.e. address 2, state-machine 54 resets to a DISABLE state. When the NEXT command is detected, state-machine 54 for the module at address 1 will change state to the DISABLE state, and state-machine 54 at the next address will change state to an ENABLE state. This process repeats incrementally to the other modules at higher addresses. The data bits are then shifted into configuration registers 55. Those skilled in the art, in light of teachings of the present invention, will readily recognize that a multiplicity of alternative and suitable receiver logic or decoding techniques for each slave module may instead be implemented depending upon the needs of the particular application.

Referring again to FIG. 2, in the present embodiment, master controller module 21 includes, without limitation, the following functionalities: voltage level and battery energy level detection, bias and reference voltage generators, temperature detection, a clock generator, start-up sequence and control, power down sequence and control, a serial interface to off-chip devices, and internal communication to on-chip modules. Slave modules 24 may be of various types of modules including, without limitation, linear regulator slave modules, switching converter slave modules, analog-to-digital and digital-to-analog data converters, timing circuits, real time clocks, audio and video controllers and drivers, interface circuits, communication circuits, and general-purpose analog/digital input-output slave modules.

The linear regulator slave modules each preferably have connections to an input pad and one or more output pads. Each linear regulator slave module can be programmed to be ON or OFF and in normal or standby mode. In addition, the output voltage and current limit can be set to appropriate values depending on the load requirement. In the present embodiment, output voltage ranges from 0.5V to 5V, and the current limit ranges from 50 mA to 300 mA. It should be noted that nay voltage or current values stated in the present invention simply provides as exemplary, and any suitable range of values may be configured depending upon the needs of the particular application.

The switching converter slave modules each have a power rail pad, a power ground pad, an inductor pad, and a feedback pad. Each switching module can be programmed to be ON or OFF, in normal or standby mode, and in buck or boost mode. In addition, the output voltage and current limit can be set to appropriate values depending on the load requirement. In the parent embodiment, the output voltage ranges from 0.5V to 5V, and the current limit ranges from 0.5A to 2A.

Furthermore, the switching clock frequency can be adjusted to be a fraction of or a multiple of the master synchronization clock frequency, while the switching clock phase shift can be adjusted to a resolution of a fraction of the master synchronization clock period.

In the present embodiment, the general-purpose analog/digital input-output slave modules each have one or more sets of general-purpose input-output pads. Each pad can be configured to be either input or output and can be disabled or enabled. Furthermore, in the case where the pad is configured as an input, the signal from the pad can either be processed inside the module or propagated to other modules via configurable interconnection network 25.

The architecture of the present embodiment is scalable in that additional functionality can be added by adding modules into the original chip without modifying the circuit, layout or placement of previous modules. Any additional slave module that follows the same interface protocol with the internal communication network and the interconnection network can be dropped in without affecting the functionality of the other other modules. In the present embodiment, each slave module is designed to follow a certain geometric shape layout with a standardized region containing the interface circuitry to the internal communication network and the interconnection network. A standard network of wires forming the internal communication network and the interconnection network traverses the IC die layout. As more functionality is needed, more slave modules are simply placed onto the networks. The modules are well-understood designs to those skilled in the art and have been successfully manufactured and tested beforehand. In this way, the present architecture encourages reuse of intellectual properties. Furthermore, this architecture, together with state-of-the art wafer level packaging technology, generally minimizes the risk of function or parametric change or failure due to custom placement of pads and change of layout. This is possible because ball-grid array technology allows the modules to be laid out in a fixed-pitch die area with associated pads at the ball-grid array ball locations.

Although not shown, it is contemplated that in alternate embodiments of the present invention, that two or more slave modules may be configured to act as a single module in a synergistic manner. By way of example, and not limitation, if an original IC design provided for a switching regulator block that generates 1 A of current, but later IC revisions required 2 A of current output capability, then if the original IC was configured with two space 0.5 A switching regulator slave modules, their outputs could all be combined with the original 1 A regulator to achieve the later required 2 A regulator specification, without any changes to the die layout. This may be achieved by configuring all said switching regulator slave modules to switch at the same or coordinated switching frequency and phase, and to respond to the same voltage regulation feedback loop error signals. In a typical application, only the routing layers may have to be redone, which is a significantly easier and less inexpensive task as compared to having to redesign the IC die layout. Moreover, in yet other embodiments of the present invention (not shown), it is contemplated that there may be an additional programmable layer that receives the slave module outputs and programmable combines any combination of them to achieve a certain combined output that meets the needs of a particular specification or function.

Having fully described at last one embodiment of the present invention, other equivalent or alternative means for implementing a scalable and programmable power management IC according to the present invention will be apparent to those skilled in the art. The invention has been described above by way of illustration, and the specific embodiments disclosed are not intended to limit the invention to the particular forms disclosed. The invention is thus to cover all modification, equivalents, and alternatives falling within the spirit and scope of the following claims.

What is claimed is:

1. An integrated circuit for scalable and programmable power management, the integrated circuit comprising:
   a master controller module;
   a communication network in operable communication with said master controller module; and
   a first slave module in operable communication with said communication network, said first slave module performing a power management or conversion function that is at least in part controlled by a control command communicated from said master controller module to said first slave module, said control command being communicated and received through said communication network, and said control command being decoded by said first slave module.

2. The integrated circuit of claim 1, wherein said first slave module comprises a circuit that supplies power to a load that is not part of said integrated circuit.

3. The integrated circuit of claim 1, wherein said first slave module comprises a circuit that supplies power to a load that is part of said integrated circuit.

4. The integrated circuit of claim 1, further comprising:
   a second slave module, wherein a program configures said integrated circuit and, when executed, causes said master controller module to sequentially communicate second control commands dictated by said program to said first slave module and then to said second slave module, thereby making said first slave module and said second slave module functionally programmable.

5. The integrated circuit of claim 1, wherein said integrated circuit receives, from an external source, a programming instruction that when executed causes said master controller module to communicate second control commands dictated by said program to said first slave module, thereby making said first slave module functionally programmable.

6. The integrated circuit of claim 1, wherein said first slave module comprises a voltage conversion device.

7. The integrated circuit of claim 6, wherein said voltage conversion device is a charge-pump converter, a linear voltage regulator, a step-up voltage regulator, or a step-down voltage regulator.

8. The integrated circuit of claim 1, further comprising:
   a coupling device; and
   a second slave module, wherein said first slave module and said second slave module are voltage conversion modules, and combines the power output of each voltage conversion module into one combined voltage conversion module, which is at least partially under the command control of said master control module.

9. The integrated circuit of claim 1, wherein said communication network is a serial or parallel communication network.

10. The integrated circuit of claim 1, wherein said control command is digitally encoded and wherein said first slave module comprises a digital configuration interface that receives said control command and decodes said control command and directly or indirectly controls an aspect of said first slave module.

11. The integrated circuit of claim 1, further comprising:
    a second slave module with a configuration register, wherein said control command is simultaneously received by both said first slave module and by said second slave module, and wherein said second slave module decodes said control command and disables said configuration register.

12. A configurable integrated circuit for scalable and programmable power management, the integrated circuit comprising:
    a master controller module that transmits a digitally encoded control command;
    a serial communication network in communication with said master controller module such that said control command is communicated through said serial communication network; and
    a voltage conversion slave module in communication with said communication network such that said voltage conversion slave module receives said control command, said voltage conversion slave module being configured with a digital configuration interface that receives and decodes said control command to directly or indirectly control a voltage conversion function that is at least in part based on said control command received from said master controller module.

13. The integrated circuit of claim 12, wherein said voltage conversion slave module comprises a charge-pump converter, a linear voltage regulator, a step-up voltage regulator, and/or a step-down voltage regulator.

14. The integrated circuit of claim 12, further comprising:
    a second slave module, wherein a program configures said integrated circuit and, when executed, causes said master controller module to sequentially communicate second control commands dictated by said program to said voltage conversion slave module and to said second slave module, thereby making said voltage conversion slave module and said second slave module functionally programmable.

15. The integrated circuit of claim 12, wherein said integrated circuit receives, from an external source, at least one programming instruction that when executed causes said master controller module to communicate second control commands dictated by a program to said voltage conversion slave module, thereby making said voltage conversion slave module functionally programmable.

16. The integrated circuit of claim 12, further comprising:
    a coupling device; and
    a second voltage conversion slave module, wherein said coupling device combines the power output of each voltage conversion slave module into one combined voltage conversion module, which is at least partially under the command control of said master control module.

17. An integrated circuit for scalable and programmable power management, the integrated circuit comprising:
a power conversion device including means for controlling at least one aspect thereof;
means for networking said power conversion device; and
means for orchestrating the real-time behavior of said power conversion device by communicating a control command via said networking means to said power conversion device, wherein said power conversion device decodes said control command.

18. The integrated circuit of claim 17, further comprising:
means for making said power conversion device functionally programmable.

19. The integrated circuit of claim 17, wherein said power conversion device is a charge-pump converter, a linear voltage regulator, a step-up voltage regulator, or a step-down voltage regulator.

20. The integrated circuit of claim 17, further comprising:
a second power conversion device; and
means for combining the power output of each power conversion device into one combined power conversion module, which is at least partially controlled by said orchestrating means.

* * * * *